United States Patent [19]

Guillot et al.

[11] Patent Number: 4,645,139
[45] Date of Patent: Feb. 24, 1987

[54] PROCEDURE FOR STEERING A LOW-SPEED MISSILE, WEAPON SYSTEM AND MISSILE FOR IMPLEMENTATION OF THE PROCEDURE

[75] Inventors: Jean Guillot, Chatenay-Malabry; Jacques Raynaud, Savigny-sur-Orge; Michel Maree, Gif-sur-Yvette; Robert Vaillant, Paris; Jean Ansaldi, St. Remy-Les-Chevreuses, all of France

[73] Assignee: Societe Nationale Industrielle Aeropatiale, Paris, France

[21] Appl. No.: 386,636

[22] Filed: Jun. 3, 1982

[30] Foreign Application Priority Data

Jun. 4, 1981 [FR] France ............................. 81 11088

[51] Int. Cl.$^4$ ...................... F42B 15/033; F42B 15/02
[52] U.S. Cl. .................................... 244/3.22; 102/374; 102/476
[58] Field of Search ............................. 89/1.816, 1.819; 102/374, 476; 244/3.1, 3.22, 3.23, 3.24

[56] References Cited

U.S. PATENT DOCUMENTS

| 2,524,591 | 10/1950 | Chandler | 102/352 |
| 3,283,721 | 11/1966 | Kruzell | 102/380 |
| 3,439,613 | 4/1969 | Thomanek | 102/476 |
| 3,588,003 | 6/1971 | Johnston | 244/3.22 |
| 3,684,215 | 8/1972 | Jacobson et al. | 102/374 |
| 3,749,334 | 7/1973 | McCorkle, Jr. | 244/3.22 |
| 3,859,890 | 1/1975 | Guthrie | 89/1.816 |
| 3,986,683 | 10/1976 | Ellison | 244/3.22 |
| 4,078,495 | 3/1978 | Ledden, Jr. | 244/3.22 |
| 4,244,293 | 1/1981 | Grosswendt et al. | 102/374 |

FOREIGN PATENT DOCUMENTS

| 1172156 | 6/1964 | Fed. Rep. of Germany | 102/374 |
| 1264869 | 3/1968 | Fed. Rep. of Germany | 102/374 |
| 2331031 | 9/1975 | Fed. Rep. of Germany | 89/1.818 |
| 3205431 | 8/1983 | Fed. Rep. of Germany | 102/374 |
| 2448706 | 10/1980 | France | 102/380 |
| 126153 | 9/1949 | Sweden | 102/374 |
| 229444 | 1/1944 | Switzerland | 102/374 |

Primary Examiner—Charles T. Jordan
Attorney, Agent, or Firm—Antonelli, Terry & Wands

[57] ABSTRACT

A procedure for steering a missile launched at low speed from a tube, with the missile being equipped with a propulsion unit system of the type with a propellant fuel charge. The procedure is characterized by the fact that the above-mentioned propulsion unit system is determined and arranged in such a way that it can simultaneously impart to the missile axial propulsive thrust and maneuver forces for steering by force and that the variation of the position of the center of gravity of the missile on its axis as a function of the burn-up of the propellant charge is such that, when the missile leaves the tube, the center of gravity passes through the line of action of the above-mentioned maneuver forces and that, during its flight, makes it possible for torques to develop which generate aerodynamic angles of attack and which produce maneuver forces which are added to those of steering by force.

11 Claims, 13 Drawing Figures

PROCEDURE FOR STEERING A LOW-SPEED MISSILE, WEAPON SYSTEM AND MISSILE FOR IMPLEMENTATION OF THE PROCEDURE

The present invention pertains to a procedure for steering a low-speed missile, a weapon system and a missile for the implementation of the procedure. This invention applies most particularly to infantry weapon systems of the "man-pack" type, i.e., it is portable and can be used by a single man. The corresponding missiles are designed to neutralize armored ground targets, mobile or otherwise, in particular tanks. The payloads to be carried by the missiles are essentially made up of combat payloads. These loads, which must be effective against the new armors, have significant masses and calibers. It must be possible to fire these weapons systems from confined spaces (shelters, basements, buildings, etc.) with a very small minimum range of several tends of meters, while, in various implementations, the maximum ranges can be set between approximately 600–700 meters and approximately 2000 meters.

Regardless of the questions of dispersion when the missiles are launched and dispersion due to the wind or drifting, the use of infantry anti-tank weapons beyond the range of 300 meters means that corrections must be made to the trajectory of the missile in order to take into account, in particular, the effect of gravity and the movement of the target in a line. Due to considerations of ergonomics and mass, it is not possible, at the muzzle of the weapon, to obtain speeds which are high enough to cover the necessary distances within the period of time on the order of one second.

Two methods of correction are possible:

An open-loop guidance correction, which amounts on the one hand to correcting for the effect of gravity and on the other to measuring the movement of the target in a line before firing and to derive therefrom a correction "program", which must be developed and set in the weapon before firing. In the firing sequence, this procedure means that the movement characteristics of the target are measured and that it is assumed that, during the time when the missile is in flight, these characteristics will not vary significantly;

A closed-loop correction in which the system tends to eliminate the deviation of the missile from the axis between the firing position and the target until the missile completes its flight.

The open-loop guidance correction requires that the flight take a short period of time since the movement of the target is extrapolated, and among other things this type of correction implies for the missile a significant muzzle or initial velocity in order to overcome the effects of the wind or drift as well as possible.

The closed-loop guidance correction is compatible only with a missile to which a low initial velocity is imparted.

At present, use is made of a high initial velocity in order to ensure that the missile will have sufficient aerodynamic maneuverability when it leaves the tube. Regardless of the launch system (gas generator, booster, etc . . . ), this approach requires a considerable powder charge, which imposes constraints in terms of weight, bulkiness, the blast effect, flame, noise, and release of gas, which are incompatible with firing in a confined space and discreteness of fire i.e., being able to fire without being detected.

Suitability for firing in a confined area requires that a small powder charge be used at launch. The corresponding devices can be of well-known types such as fuze boosters, ejection systems such as guns or recoilless guns with very low ejection speeds, etc.

The comfort of the gunner is increased because the noise is greatly reduced, discreteness when the missile is launched is ensured and the recoil of the weapon on the gunner can be almost zero; by the same token, the missile leaves the weapon at low speed. The result is that classic aerodynamic steering by taking an angle of attack which generates torque forces cannot be used since the aerodynamic forces are too slight. Only steering by force, i.e., by means of maneuver forces which pass through the center of gravity, makes it possible, as soon as the missile is launched, to ensure good maneuver capacity and a short response time of the missile which can thus counter the effects of the force of gravity and of the wind and to attack targets maneuvering a short distance away. With such steering by force, no or only a slight aerodynamic angle of attack is taken; rather there is direct displacement of the center of gravity.

In the case of a low-speed missile, such maneuver forces can only be propulsive in origin. Since the maintenance of steering by force makes it necessary to maintain the application of the maneuver forces on the center of gravity of the missile, the result is that the consumption of the propellant powder which generates these forces is high, and this has a penalizing effect on the mass of the weapon. In addition, the centering adjustments are difficult to obtain since the maneuver force must pass precisely through the overall center of gravity throughout the entire flight.

The purpose of the present invention is to correct this drawback. This invention makes it possible to obtain a light weapon system, the low-speed missiles of which can be precisely guided without needing delicate adjustments.

For this purpose, according to the invention the procedure for steering a missile which is launched at low speed from a tube and is equipped with a propulsion system of the propellant fuel charge type is noteworthy in that this propulsion system is determined and outfitted in such a way that it can simultaneously impart to the missile axial propulsive thrust and maneuver forces for steering by force and that the variation in the position of the missile's center of gravity on its axis as a function of the combustion of the propellant charge is such that, when it leaves the tube, the center of gravity passes through the line of action of the above-mentioned maneuver forces and that, during the flight, the invention makes it possible for torques to develop which generate aerodynamic angles of attack and produce maneuver forces which are added to those of the steering by force.

Thus, the prevent invention consists of linking the steering by force of the missile when it leaves the launch tube to a particular arrangement of the of the flight propulsion unit in this missile which makes it possible to ensure that the missile is steered solely by force upon its launching, with this association being effective at low initial velocities, and then by changing the center of gravity the shift is made to mixed steering (combination of steering by force and aerodynamic steering) when the flight speed has increased sufficiently.

As will be seen below, it is advantageous to ensure, during flight, that the center of gravity of the missile moves back along its axis.

By preference, a weapon system which is designed to implement the procedure of the invention and which comprises a launch tube and the missile, with the latter being equipped with a propulsion system and control devices, is unique is that this propulsion system includes, on the one hand, at least one integrated booster, the combustion of which ends before the missile leaves the tube and which is capable of imparting to the missile a low initial speed when it leaves the tube and, on the other, at least one flight propulsion unit which is equipped with lateral means of steering by force.

The missile is ejected from its tube by the integrated booster which imparts to the missile a longitudinal acceleration and may set the missile in rotation, but in doing so generates no appreciable recoil at the firing position. The combustion of the charge or the boosters is completed within the launch tube, and the missile leaves this launch tube with a longitudinal speed on the order of 20 m/sec and possibly an autorotation speed of approximately 5 revolutions/sec (rps).

The means for steering by force are preferably lateral nozzles of the flight propulsion unit.

These nozzles of the flight propulsion unit are ignited after the missile leaves the tube. The fact that they are located on the sides leaves the rear section of the missile uncluttered and thus more discrete in flight and makes it easier to set up the infrared, electromagnetic, etc . . . links which may be needed between the firing position and the missile. These nozzles form an angle with respect to the axis of the missile so that their thrust along its axis has an axial component which contributes to the longitudinal thrust. The control surfaces are known devices which are capable of deflecting the propulsion jet such as movable nozzles, deflectors, jet interceptors, etc., of the types mentioned, for example, in French Pat. Nos. 1 099 901 and 1 602 885. Another known device, of intermediate complexity, makes use of a movable skirt at the nozzle outlet. The deflection of the jet causes a deflection of the thrust vector which is associated with the tube and contributes to the maneuver force. The magnitude of the deflections created by simple devices is relatively slight, and the maneuver force is low relative to the axial component of the thrust.

When the missile is launched, the maneuver force must counter the force of gravity and allow the missile good maneuver capacity; this leads to a transverse load factor on the order of two and means that, for the flight propulsion unit, there exists a significant axial component of the thrust. The missile is continuously accelerated.

The speed of the missile increases over its entire trajectory, from approximately 20 m/sec when it leaves the tube to a high subsonic value at the end of its flight. Stabilizers mounted in rear of the missile which can be deployed when it leaves the tube ensure aerodynamic stability even at low speed and thus contribute to lift during the mixed steering phase.

The thrust principle of the propulsion units can be programmed as a function of the time of flight by defining the combustion profile of the propellant charge or the nature of the powder (a two-component unit, for example). Thus a larger combustion surface for this charge at the beginning of the flight can impart to the missile a greater availability in terms of load factor which makes it possible for the missile to compensate, when it leaves the tube, for the force of gravity and the effect of the wind and to engage moving targets maneuvering at short range.

The optimization of the combustion principle for the rest of the flight makes it possible to define a minimum mass for the propellant charge.

According to the invention, advantage is taken of the fact that, during the flight, the center of gravity can vary from the position imposed at launch. Special measures are taken regarding the installation of the different subassemblies which make up the missile in such a way that this variation in the center of gravity, which induces aerodynamic forces, is done in a direction which makes it possible to achieve the desired performance.

In particular, it is possible to mount the flight propulsion unit in the front of the missile and the combat payload in a single element in the rear, or to have the payload divided into two or more elements on both sides of the propulsion unit in such a way that the center of gravity of the missile moves to the rear during its flight (unballasting), thus producing the mixed steering effect. At the same time, this arrangement is particularly advantageous for the action of the hollow charge (single or multiple) with which the missile is equipped, by increasing in particular the attack distance (distance between the charge and the armor at the instant of detonation).

The invention is explained below using the description, which is given in a non-limiting manner, and with the aid of the appended drawings. This description pertains to a short-range AT (anti-tank) weapons system.

In these drawings:

FIG. 7a depicts for a combat payload of the hollow-charge type the effect of the range of action (a) on effectiveness, characterized by the penetration obtained (b) in a semi-infinite steel plate, while FIG. 7b shows the respective penetration characteristics for the missiles shown in FIGS. 1 and 3.

Figure 1:
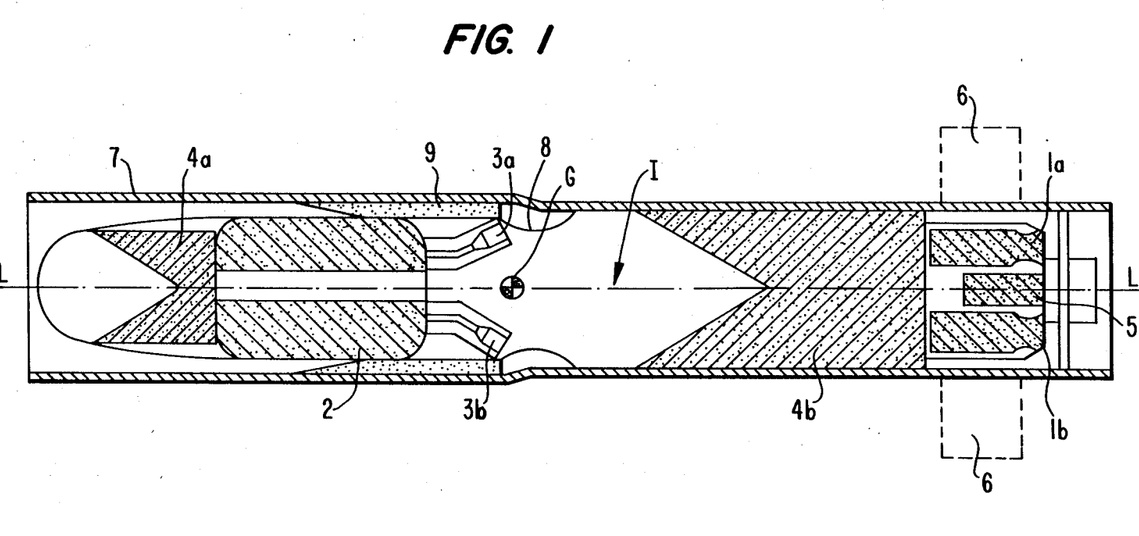
FIG. 1 is a schematic along an axial section of a weapons system as described by the invention which comprises a missile in its launch tube; this system uses pure steering by force upon launch but features an unballasting principle associated with the disappearance or consumption of the consumable products which, by virtue of the aerodynamic effects, enhances the maneuver capacity of the missile at the end of its flight.
Figure 2:
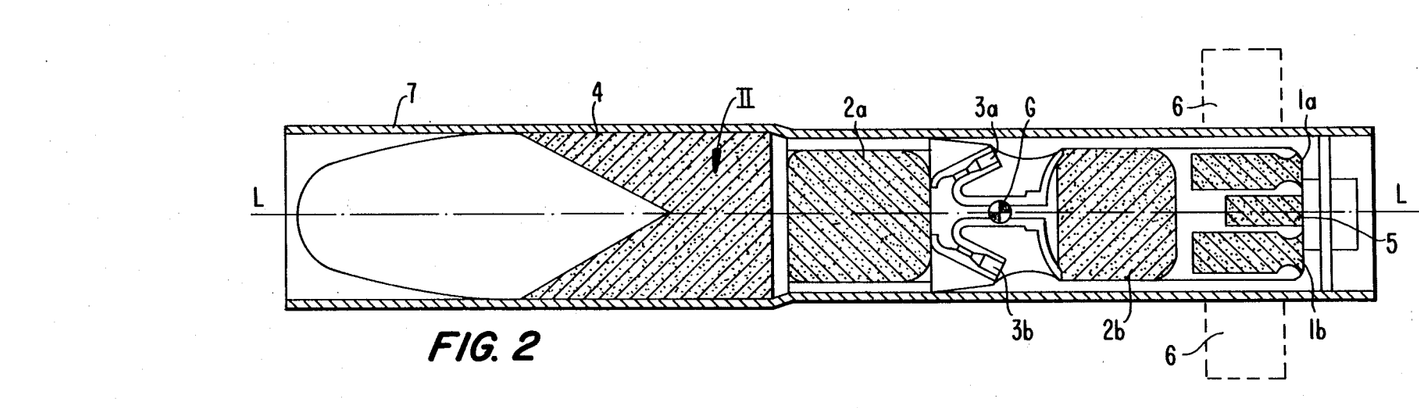
FIG. 2 shows a similar schematic of a missile in its launch tube which uses exclusively steering by force throughout the entire flight with the center of gravity of the missile remaining fixed.
Figure 3:
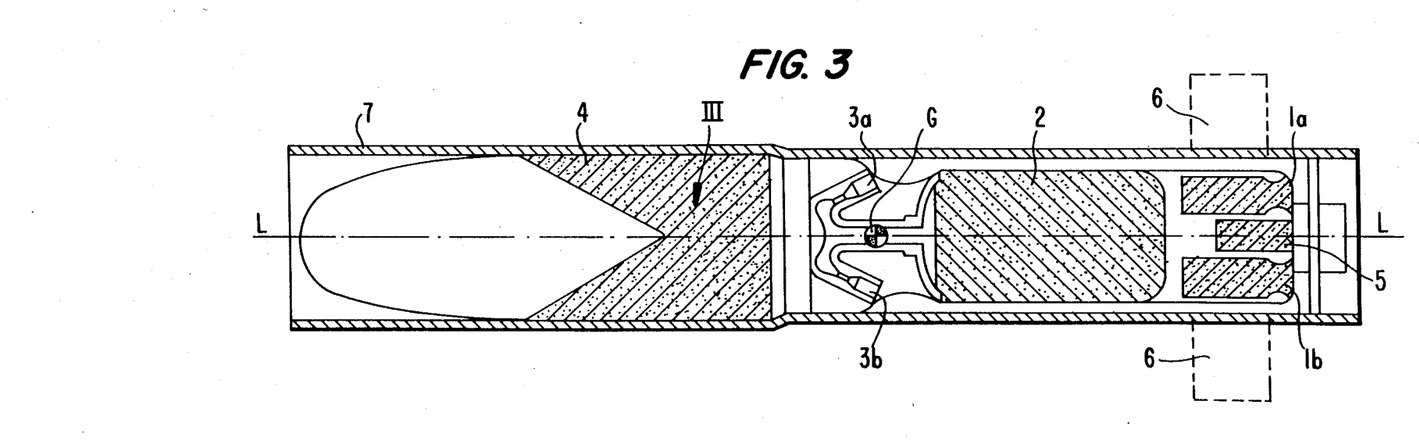
FIG. 3 shows a similar schematic for a missile which uses exclusively steering by force upon launch but for which the unballasting principle associated with the consumption of the consumable products ultimately introduces a reduction in the missile's maneuver capacity at the end of its flight.
Figure 8A:
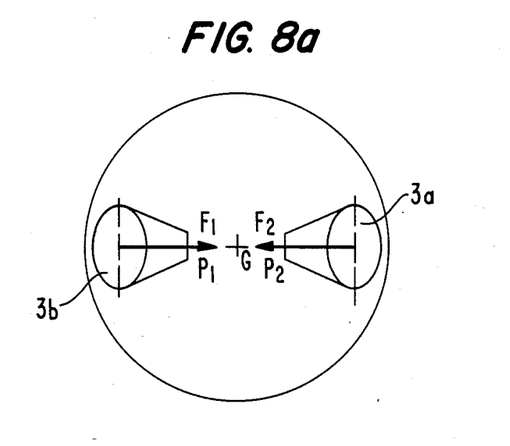
FIGS. 8a and 8b show schematically without any steering order the breakdown of the thrust vectors of the missile nozzles of FIG. 1, in rear and top views, respectively.
Figure 8B:
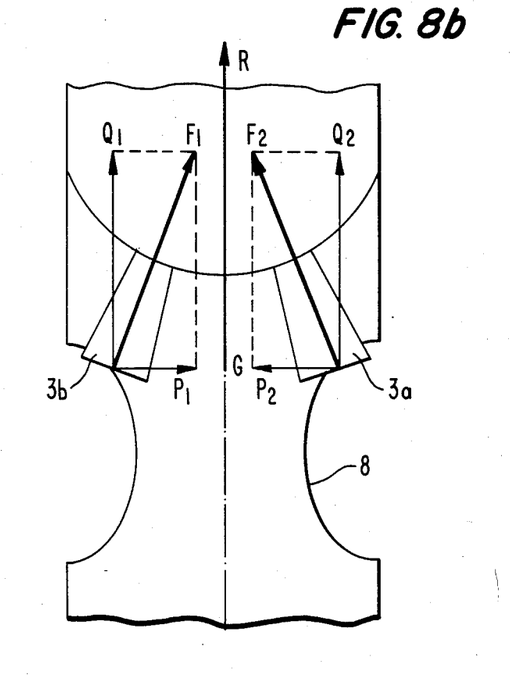

The AT missiles I, II and III of FIGS. 1, 2 and 3 comprise:

(a). Two boosters 1a and 1b mounted in the rear and designed to impart to the missiles, when they leave the launch tubes 7, a speed of, for example, 20 m/sec. Boosters 1a and 1b are of the type with a fuel charge and the combustion of this propellant charge takes place completely within launch tube 7 in order to avoid hampering the gunner. This small gain in speed is acquired by the combustion of an equally small mass of powder which is compatible with firing of the missile in a confined space;

(b). A flight propulsion unit 2, which is ignited several meters after leaving tube 7 in order to avoid hampering the gunner and to thus ensure that the missile is beyond the confined space. This propulsion unit 2 comprises two identical nozzles 3a and 3b which are attached in such a way as to be coplanar and symmetrical with respect to the longitudinal axis L—L of the missile. The axes of above-mentioned nozzles 3a and 3b coincide on the longitudinal axis of the corresponding missile and are inclined symmetrically on this axis. In the absence of any steering order (see FIGS. 8a and 8b):

The axial component $R = Q_1$ and $Q_2$ of the thrust $F_1$ and $F_2$ of the two nozzles 3a and 3b makes it possible for the missile to fly;

The effect, on the missile, of the components $P_1$ and $P_2$ of thrusts $F_1$ and $F_2$ of nozzles 3a and 3b is zero by symmetry, in the plane of the nozzles.

For each of tubes 3a and 3b, the skin of the missile has an opening 8 to allow the gases to pass.

Figure 9A:
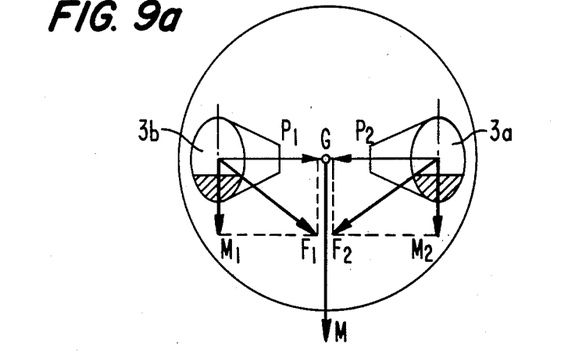
FIGS. 9a, 9b and 9c depict schematically in the presence of a steering order the breakdown of the thrust vectors of the nozzles of the missile in FIG. 1, in rear, top and side views, respectively.
Figure 9B:
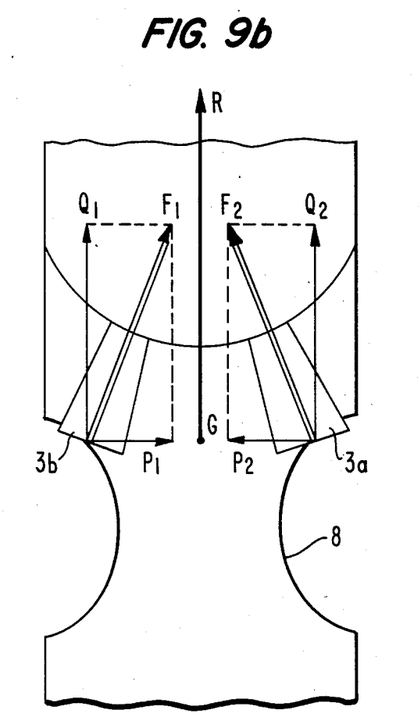
Figure 9C:
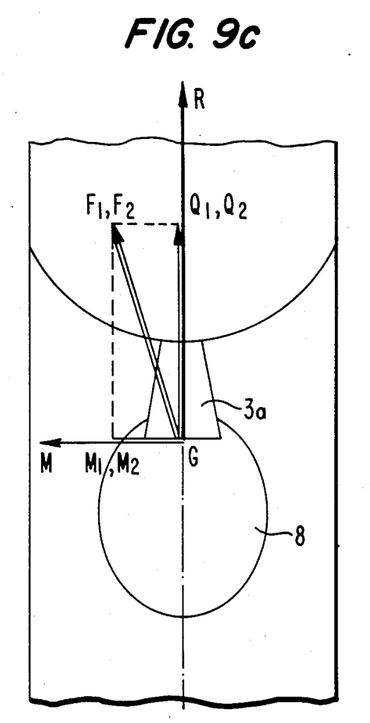

Each tube 3a or 3b is equipped with a jet interception or deflection system (of a known type which is not shown) which makes it possible, on receipt of a steering order, to deflect the jets of the two nozzles 3a and 3b simultaneously and in the same direction, thus generating a transverse thrust component $M = M_1 + M_2$ which is orthogonal to the plane of the two nozzles 3a and 3b (see FIGS. 9a, 9b and 9c). This transverse thrust component M makes it possible to maneuver the missile;

(c). A combat payload 4, of the hollow-charge type;

(d). An equipment block 5, which is mounted in the rear portion of the missile and houses the means required for guiding and steering the missile;

(e). Retractable empennage 6 which ensures aerodynamic stability;

(f). A storage tube 7, which serves as a launch ramp.

When missile I, II or III leaves tube 7 under the action of the two boosters 1a and 1b, the combustion of the boosters is terminated and the center of gravity G of the missile is then in the plane which contains the transverse component M of the thrust of the cruise propulsion unit 2. The missile is thus steered solely by force.

In the case of missile II of FIG. 2, charge 4 is located in the front and main propulsion unit 2 is subdivided into two units 2a and 2b which are mounted on both sides of the center of gravity G and burn up in an identical fashion in such a way that during the flight itself the center of gravity G remains fixed. This is illustrated by diagram B of FIG. 4 which depicts the variations in the distance 1 separating the front of missile I, II or III from its center of gravity G as a function of time T (in FIG. 4, it was assumed that the time axis runs from the right to the left).

In missile III of FIG. 3, charge 4 is located in front, as in FIG. 2, but propulsion unit 2 is a one-piece unit and is opposite charge 4 with respect to the center of gravity G. In addition, as the charge of propulsion unit 2 is used up, the center of gravity G moves towards the front of missile III and distance 1 decreases. This is illustrated by curve C in FIG. 4.

Figure 4:
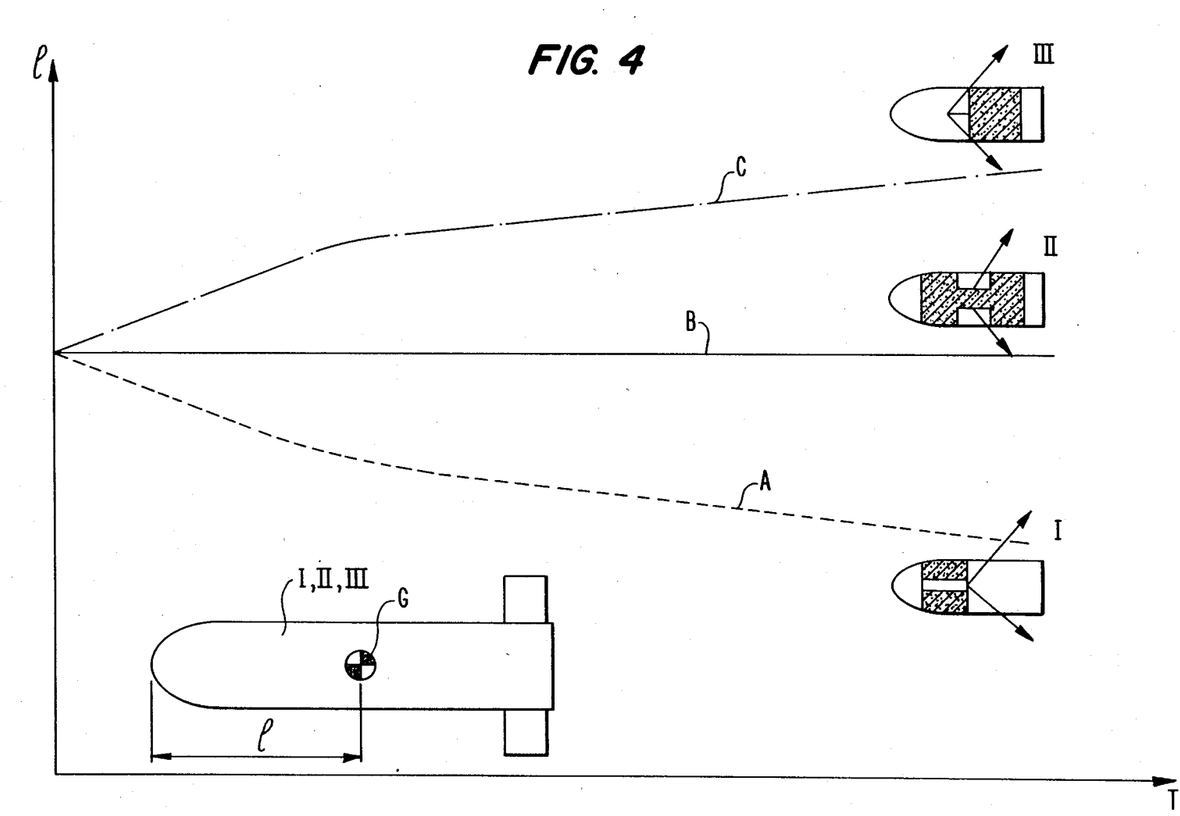
FIG. 4 shows curves which characterize the laws of variation of the positions of the center of gravity during the flight of the missile for, respectively, the above-cited types of missiles as shown by the FIGS. 1, 2 and 3, the silhouettes of which are drawn in schematically. These curves are given in order to make it possible to perform a qualitative and not a quantitative comparison.

Conversely, in missile I as described by the invention (see FIG. 1), flight propulsion unit 2 is mounted in the front, while charge 4 is subdivided into a main charge 4b located in the rear and an auxiliary charge 4a (which may be omitted) mounted in the front. The result is that, as the powder of flight propulsion unit 2 is burned up, the center of gravity G of missile I moves to the rear (unballasting), the axial speed increases and, with each maneuver order which is given, the transverse component M of the thrust of propulsion 2 creates a torque which generates an angle of attack, i.e., lift. The transverse component M and the lift which are thus generated each produce maneuver effects, which are added. In FIG. 4, curve A illustrates the increase in distance 1 as the time of flight increases.

Figure 5:
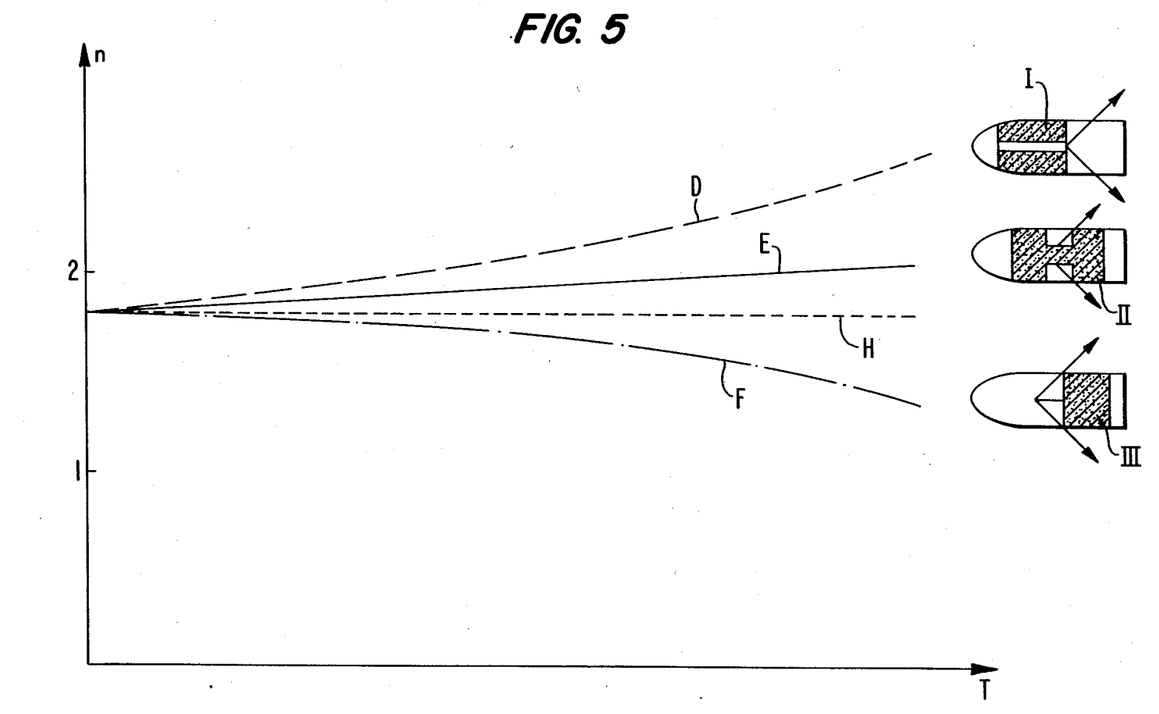
FIG. 5 presents curves which illustrate the variation in the maneuver capacities of the missiles in FIGS. 1, 2 and 3, the silhouettes of which are shown schematically. These curves are given to allow a qualitative and not a quantitative comparison.
Figure 6:
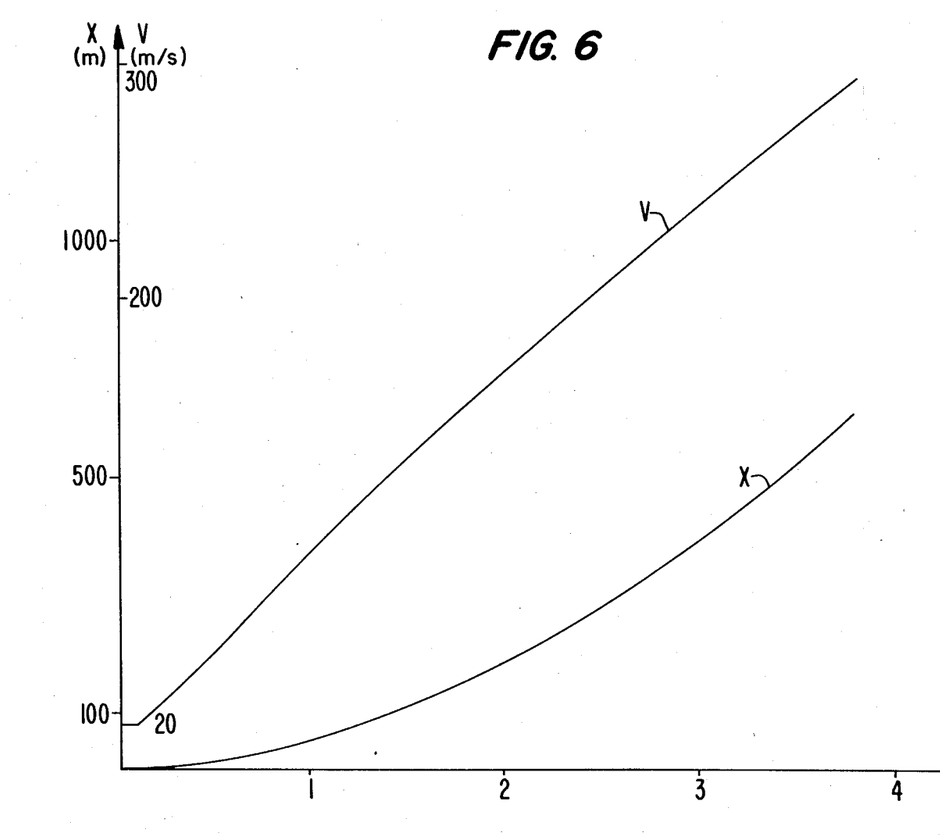
FIG. 6 presents the curves of the variation in the speed and distance covered as a function of time for the missile in FIG. 1.

In FIG. 5 curves D, E and F illustrate the maneuver capacity of missiles I, II and III as a function of flight time. For this purpose the load factor n was plotted on the ordinate and time T on the abscissa. This figure shows that the maneuver capacity of the missile as described by the invention undergoes an increase in time, while missile III of FIG. 3 becomes less and less maneuverable. For missile II of FIG. 2, there is a slight increase in maneuver capacity due to the unballasting consumption of the propellant charge (the straight line H represents the imaginary case of zero unballasting). FIG. 6 shows speed V (in m/sec) of missile I and distance X (in m) covered by it as a function of time T (in sec).

Figures 7A, 7B:
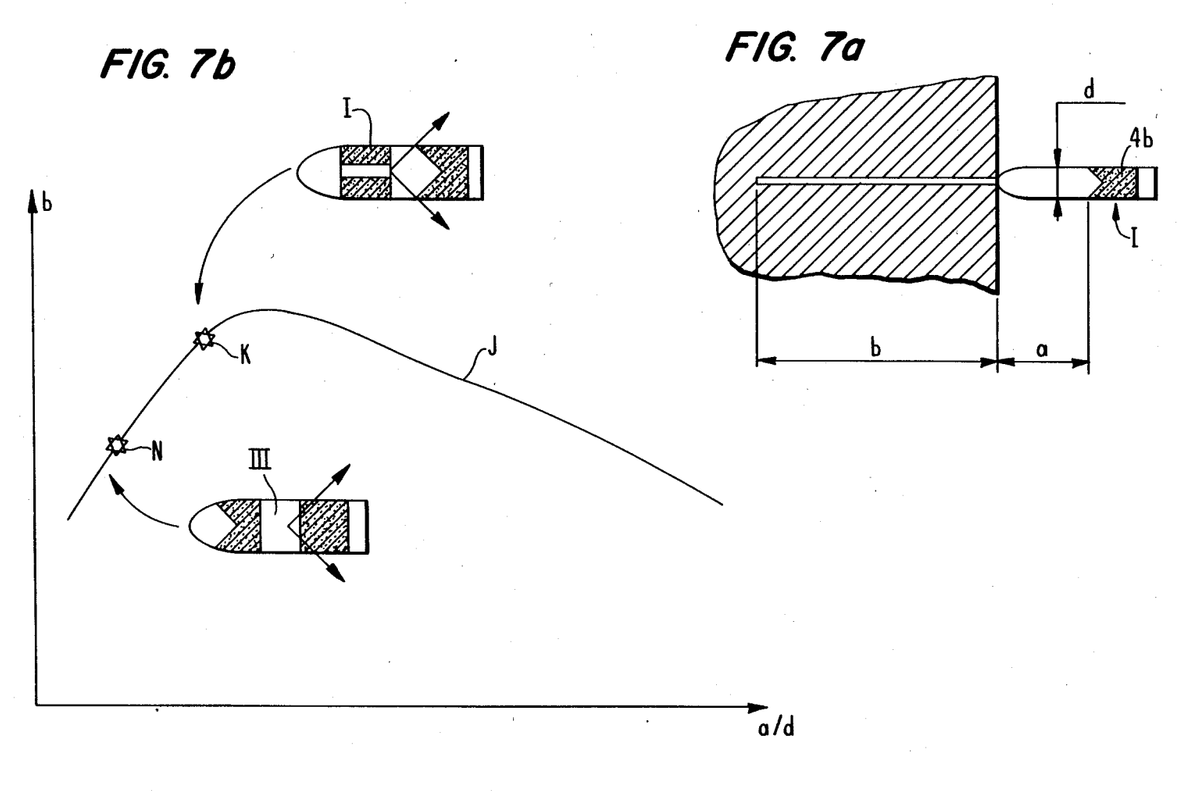

Note that it is advantageous to divide a combat payload of the hollow-charge type into two elements, of which one 4a is in front of the propulsion unit and the other 4b is behind it. As a matter of fact, for the same missile length this arrangement makes it possible to have a range of action (distance a between the charge and the armor at the instant of detonation) for the main rear charge 4b which is considerably greater than in the case of a classic design with the main charge in front (see FIGS. 2 and 3); this makes the charge much more effective, i.e., it greatly promotes the penetration b into a plate of armor (see FIG. 7a). Curve J of FIG. 7b shows that the penetration distance b passes through a maximum as a function of the ratio a/d where a is the above-defined range of action and d is the diameter of the missile (FIG. 7a). On curve J, the missile I as described by the invention corresponds to a more advantageous point K than point N, which corresponds to missile III of FIG. 3.

Above we have described an example of a missile which is brought into autorotation around its axis L—L in such a way that two nozzles for steering by force are sufficient. If the missile were stabilized in terms of roll, it would have to comprise at least four lateral means of steering by force.

As FIG. 1 shows, towards the front tube 7 can exhibit a diameter which exceeds that of its rear section, and the front part of the missile, which is also smaller in diameter than its rear part, is secured by an annular shim 9.

We claim:

1. A missile for launching from a launching tube; the missile including a combat payload and a propulsion system of the propulsive fuel load type; the propulsion system comprising a first propulsive means arranged in the rear of the missile, the combustion of the first propulsive means being terminated before the missile exits from the launching tube, the first propulsive means imparting a low initial speed to the missile when the missile exits from the launching tube, and a second propulsive means including lateral nozzles for enabling steering of the missile by force and arranged for simultaneously imparting to the missile during flight of the missile axial propulsive thrust and maneuver forces for steering by force; the combat payload, the first propulsive means and the second propulsive means being arranged in the missle so that when the missile exits from the launching tube after combustion of the first propulsive means, the center of gravity of the missile is positioned in a plane transverse to the longitudinal axis of the missile and including the maneuver forces, and during the flight of the missile and progressive combustion of the second propulsive means, the position of the center of gravity of the missile moves rearwardly along the longitudinal axis of the missle thereby enabling the generation of aerodynamic torques for producing maneuver forces which are added to the maneuver forces provided for the steering by force.

2. A missile according to claim 1, wherein the second propulsive means is mounted in the forward portion of the missile and at least a portion of the combat payload is located in the rearward portion of the missile.

3. A missile according to claim 2, wherein the combat payload includes a main charge portion located in the rearward portion of the missile and an auxiliary charge portion located in the forward portion of the missile.

4. A missile according to claim 2, wherein the combat payload is located forwardly of the first propulsive means.

5. A missile according to claim 3, wherein the main charge portion is located forwardly of the first propulsive means and the auxiliary charge portion is located forwardly of the second propulsive means.

6. A missile according to claim 1, wherein the combat payload includes at least a main charge portion, the main charge portion being located forwardly of the first propulsive means.

7. A missile according to claim 6, wherein the combat payload includes an auxiliary charge portion, the auxiliary charge portion being located forwardly of the second propulsive means.

8. A missile according to claim 1, wherein the second propulsive means is arranged for burning symmetrically with respect to the longitudinal axis of the missile.

9. A missile according to claim 1, wherein the missile is roll stabilized and the second propulsive means includes at least four lateral nozzles for enabling steering by force.

10. A missile according to claim 1, wherein the missile auto-rotates about the longitudinal axis thereof and the second propulsive means includes only two lateral nozzles for enabling steering by force.

11. A weapon system according to claim 1, further comprising a launching tube for launching the missile.

* * * * *